(12) United States Patent
Moon et al.

(10) Patent No.: US 7,009,856 B2
(45) Date of Patent: Mar. 7, 2006

(54) VECTOR-CONTROLLED DUAL INVERTER SYSTEM AND METHOD FOR INDUCTION MOTOR

(75) Inventors: Sang Hyun Moon, Hwaseong (KR); Kwang Hee Nam, Pohang (KR); Jun Ha Kim, Anyang (KR)

(73) Assignee: Hyundai Motor Company, Seoul (KR)

( * ) Notice: Subject to any disclaimer, the term of this patent is extended or adjusted under 35 U.S.C. 154(b) by 3 days.

(21) Appl. No.: 10/750,692

(22) Filed: Dec. 31, 2003

(65) Prior Publication Data

US 2005/0002210 A1    Jan. 6, 2005

(30) Foreign Application Priority Data

Jul. 4, 2003    (KR) .................. 10-2003-0045215

(51) Int. Cl.
*H02M 5/458*    (2006.01)
*H02M 5/45*    (2006.01)

(52) U.S. Cl. ............................ 363/37; 363/40; 363/98
(58) Field of Classification Search ............. 363/37, 363/35, 40, 98
See application file for complete search history.

(56) References Cited

U.S. PATENT DOCUMENTS

| 3,792,286 A | * | 2/1974 | Meier ......................... 307/58 |
| 5,198,970 A | * | 3/1993 | Kawabata et al. ............ 363/37 |
| 5,625,262 A | * | 4/1997 | Lapota ........................ 318/71 |

FOREIGN PATENT DOCUMENTS

| JP | 07-0135797 | 5/1995 |
| JP | 07-0222455 | 8/1995 |
| JP | 09-205797  | 5/1997 |
| JP | 11-0356090 | 12/1999 |

* cited by examiner

*Primary Examiner*—Bao Q. Vu
(74) *Attorney, Agent, or Firm*—Morgan Lewis & Bockius LLP

(57) ABSTRACT

A vector-controlled, dual inverter system for a three-phase induction motor is disclosed. The inverter system comprises a first inverter system which is connected to one end of three phase windings of a stator and performs compensation of a back electromotive force; and a second inverter system which is connected to the other end of the three windings of the stator and performs reactive power compensation.

3 Claims, 3 Drawing Sheets

1

VECTOR-CONTROLLED DUAL INVERTER SYSTEM AND METHOD FOR INDUCTION MOTOR

CROSS-REFERENCE TO RELATED APPLICATIONS

This application claims priority of Korean Application No. 10-2003-0045215, filed on Jul. 4, 2003, the disclosure of which is incorporated fully herein by reference.

FIELD OF THE INVENTION

The disclosed embodiments relate generally to a power inverter system, and more particularly to a power inverter system for controlling speed and torque of an induction motor utilizing a vector-controlled dual inverter.

BACKGROUND

HEVs (Hybrid Electric Vehicles) typically include an ISA (Integrated Starter and Alternator), which is an apparatus that functions as a starter, alternator, and torque assister. When the ISA is provided as an induction motor the amount of back electromotive force (back EMF) and reactive power generated by the ISA is relatively small, provided its angular velocity is low. As the angular velocity of the ISA increases, however, the amount of back EMF and reactive power also increases. If the back EMF exceeds the maximum voltage that can be supplied from a D.C. power source such as a battery, it becomes difficult to control the angular velocity of the ISA and the torque of the induction motor.

In the control of an induction motor, back EMF compensation and reactive power compensation can be performed by a single power inverter system, such that output power converted by the inverter system is decreased in proportion to an increase in reactive power. To prevent the output power from decreasing, the back EMF constant can be decreased. When the back EMF constant is decreased, however, the torque constant is also decreased resulting in the deterioration of regeneration power.

A reduction gear can be adapted to compensate the decreased output torque of the induction motor, but when the reduction gear is adapted, energy loss during power transfer increases such that the overall energy efficiency of the system decreases.

Accordingly, what is needed is a vector controlled, dual inverter system and method capable of controlling the angular velocity of an ISA and the torque of an induction motor without decreasing the overall energy efficiency of the system.

SUMMARY OF THE INVENTION

The deficiencies of conventional systems and methods are overcome by a dual inverter system including two inverter systems. A first inverter system is configured to compensate reactive power to prevent a decrease of output power, and a second inverter system is configured to compensate back EMF to prevent a decrease of output power.

In some embodiments, a vector-controlled dual inverter system for a three phase induction motor according to the present invention comprises a first inverter system which is adapted to be coupled to one end of three-phase windings of a stator and configured to compensate back electromotive force compensation; and a second inverter system adapted to be coupled to the other end of the three-phase windings of the stator and configured to compensate reactive power.

In some embodiments, the first inverter system interconnects a battery and the three-phase induction motor, and the second inverter system interconnects a capacitor and the three-phase induction motor.

In some embodiments, the first inverter system comprises: a q-axis current controller performing proportional integral control based on a difference between a q-axis current command and a q-axis current, compensating back EMF, and outputting a first q-axis voltage command; a magnetic flux controller performing proportional integral control based on a difference between a magnetic flux command and a magnetic flux and outputting a d-axis current command; a d-axis current controller performing proportional integral control based on the difference between the d-axis current command and the d-axis current and outputting a first d-axis voltage command; a first d-q/three-phase coordinate converter receiving the first q-axis voltage command and the first d-axis voltage command and converting them to a first three-phase voltage command; a first inverter converting D.C. power to A.C. power based on the first three-phase voltage command to the three-phase induction motor; and a first three-phase/d-q coordinate converter detecting the three-phase currents flowing from the first inverter to the three-phase induction motor and converting them to q-axis current and d-axis current.

Preferably, the second inverter system comprises: a voltage controller performing proportional integral control based on a difference between a DC-link capacitor voltage command and a DC-link capacitor voltage for estimating a voltage command vector and dividing the voltage command vector into a d-axis component and q-axis component; a reactive power compensator compensating the d-axis component and the q-axis component and outputting a second d-axis voltage command and a second q-axis voltage command; a second d-q/three phase coordinate converter receiving the second q-axis voltage command and the second d-axis voltage command and converting them to a second three-phase voltage command; and a second inverter converting D.C. power to A.C. power based on the second three-phase voltage command to the three-phase induction motor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE EMBODIMENTS

Overview of Dual Inverter System

Figure 1:
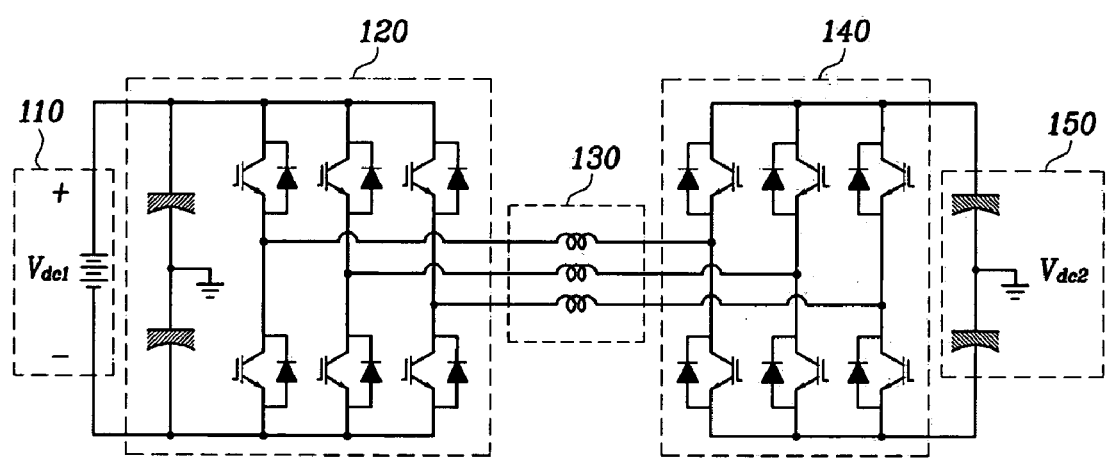
FIG. 1 is a block diagram of a vector-controlled, dual inverter system, according to an embodiment of this invention.

FIG. 1 is a block diagram of a dual inverter system according to an embodiment of this invention. The dual inter system includes a first inverter system 120 and a second inverter system 140. A three phase induction motor 130 is provided such that one end of the induction motor's stator windings are connected to the first inverter system 120, and the other end of the stator windings are connected to the second inverter system 140. A D.C. power source 110 (e.g., a battery) is connected to the first inverter system 120 and supplies D.C. power ($V_{dc1}$) to the inverter system 120. The first inverter system 120 converts the D.C. power from the power source 110 into three-phase A.C. power, and performs back EMF compensation to supply the three phase induction motor 130 with the three-phase A.C. power.

A capacitor 150 is connected to the second inverter system 140 to supply D.C. power ($V_{dc2}$) to the second inverter system 140. The second inverter system 140 converts the D.C. power provided by the capacitor 150 into three-phase A.C. power, and performs reactive power compensation to supply the three-phase induction motor 130 with three-phase A.C. power.

Control of First Inverter System

Figure 2:
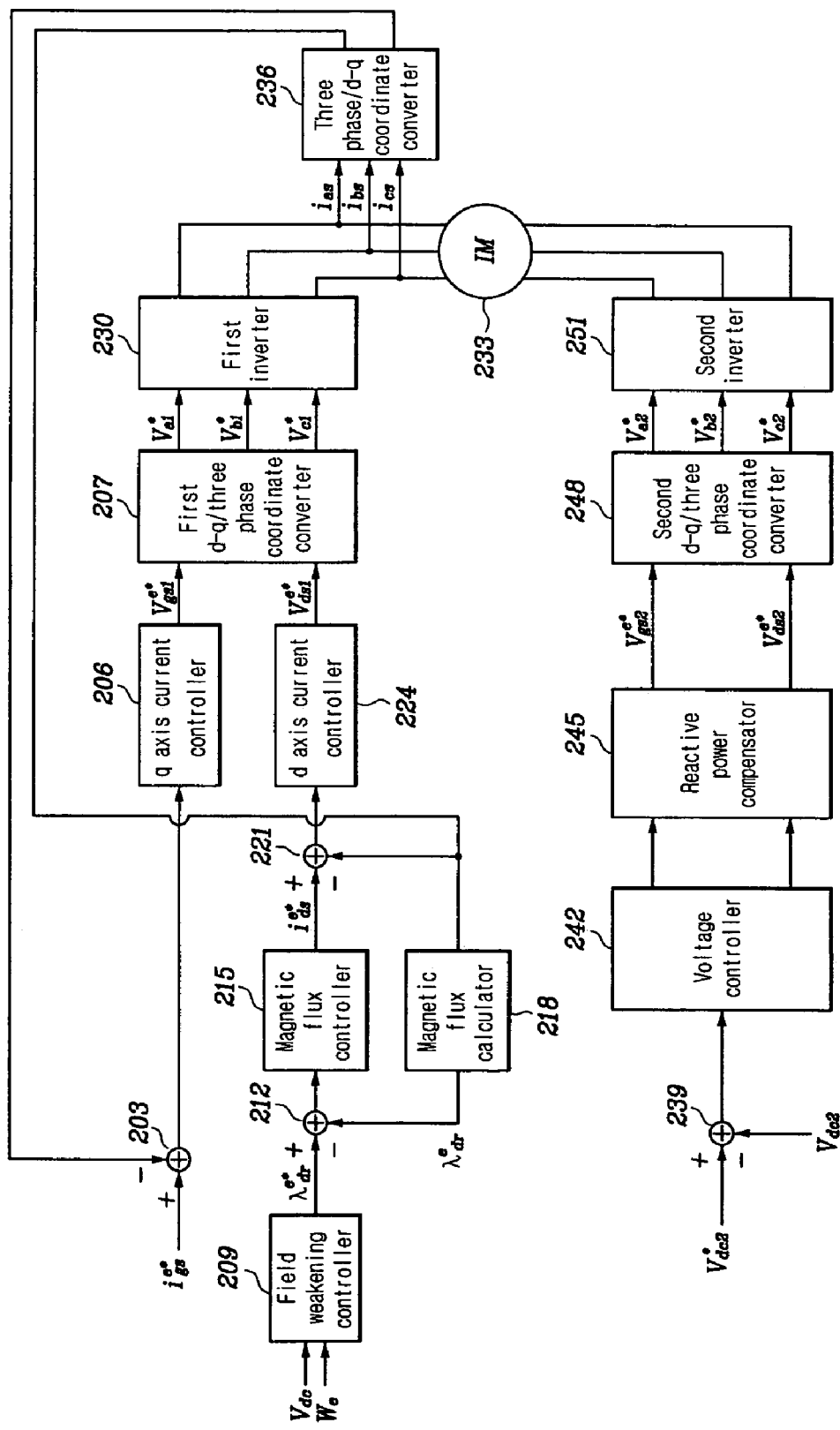
FIG. 2 is a block diagram of a control system for controlling the dual inverter system of FIG. 1, according to an embodiment of this invention.

FIG. 2 is a block diagram of a control system for controlling the dual inverter system of FIG. 1, according to an embodiment of the present invention. A control system for controlling the first inverter system 120 (FIG. 1) generally includes a q-axis current controller 206, a magnetic flux controller 215, a d-axis current controller 224, a first d-q/three-phase coordinate converter 207, a first inverter 230, and a three-phase/d-q coordinate converter 236.

As the angular velocity of the three-phase induction motor 130 is increased, back EMF is generated in proportion to the angular velocity of the induction motor's rotor ($\omega_e$) and the magnetic flux of the rotor ($\lambda_{dr}^e$). If generated back EMF becomes larger than a maximum voltage that can be supplied from a D.C. power source, it becomes difficult to control the angular velocity of the rotor and the torque of the induction motor 130.

To address this limitation, a field weakening controller 209 determines the magnetic flux command ($\lambda_{dr}^{e*}$) based on the D.C. power source ($V_{dc1}$) and the measured angular velocity of the rotor ($\omega_e$), and a first subtractor 212 outputs a residual value that is calculated by subtracting a measured magnetic flux ($\lambda_{dr}^e$) from the magnetic flux command ($\lambda_{dr}^{e*}$). The residual value from the first subtractor 212 is provided to a magnetic flux controller 215, which provides proportional integral (PI) control based on the residual value and generates a d-axis current command ($i_{ds}^{e*}$).

A second subtractor 221 provides a residual value that is calculated by subtracting a measured d-axis current ($i_{ds}^e$) from the d-axis current command ($i_{ds}^{e*}$). The residual value from the second subtractor 221 is provided to a d-axis current controller 224, which performs PI control based on the residual value and provides a first d-axis voltage command ($V_{ds1}^{e*}$).

The output from a third subtractor 203 is provided to a q-axis current controller 206, which performs PI control and reactive power compensation and outputs a first q-axis voltage command ($V_{qs1}^{e*}$).

A first d-q/three phase converter 207 receives the first d-axis voltage command ($V_{ds1}^{e*}$) and the first q-axis voltage command ($V_{qs1}^{e*}$) and converts them to a first three-phase voltage command ($V_{a1}^*, V_{b1}^*, V_{c1}^*$) on a three-phase fixed coordinate system. The first three-phase voltage command ($V_{a1}^*, V_{b1}^*, V_{c1}^*$) is applied to the first inverter 230 and is used as an input command for PWM (Pulse Width Modulation).

The three-phase currents ($i_{as}, i_{bs}, i_{cs}$) flowing from the first inverter 230 to the three-phase induction motor 233 (also shown as induction motor 130 in FIG. 1) are detected and provided to a three-phase/d-q converter 236. The three-phase/d-q converter 236 converts the three-phase currents ($i_{as}, i_{bs}, i_{cs}$) to a d-axis current and a q-axis current ($i_{ds}^e, i_{qs}^e$) such that the d-axis current ($i_{ds}^e$) is provided to the second subtractor 221 and a flux calculator 218, and the q-axis current ($i_{qs}^e$) is provided to the third subtractor 203. The flux calculator 218 calculates the magnetic flux of the rotor ($\lambda_{dr}^e$) based on the d-axis current ($i_{ds}^e$).

Control of Second Inverter System

The second inverter system 140 includes a voltage controller 242, a reactive voltage compensator 245, a second d-q/three-phase coordinate converter 248, and a second inverter 251.

A fourth subtractor 239 outputs a residual value that is calculated by subtracting a DC-link capacitor voltage ($V_{dc2}$) from a DC-link capacitor voltage command ($V_{dc2}^*$), and the residual value is provided to the voltage controller 242.

The voltage controller 242 performs PI control based on the residual to estimate a voltage command vector ($V_2^*$), and divides the voltage command vector into a d-axis component and q-axis component.

The reactive power compensator 245 compensates the d-axis component and the q-axis component of the voltage command vector ($V_2^*$), and provides a second d-axis voltage command ($V_{ds2}^{e*}$) and a second q-axis voltage command ($V_{qs2}^{e*}$).

A second d-q/three-phase converter 248 receives the second d-axis voltage command ($V_{ds2}^{e*}$) and the second q-axis voltage command ($V_{qs2}^{e*}$), and converts them to a second three-phase voltage command ($V_{a2}^*, V_{b2}^*, V_{c2}^*$).

The second three phase voltage command ($V_{a2}^*, V_{b2}^*, V_{c2}^*$) is applied to the second inverter 251 and is used as an input command for PWM (Pulse Width Modulation).

Q-Axis Current Controller

Figure 3:
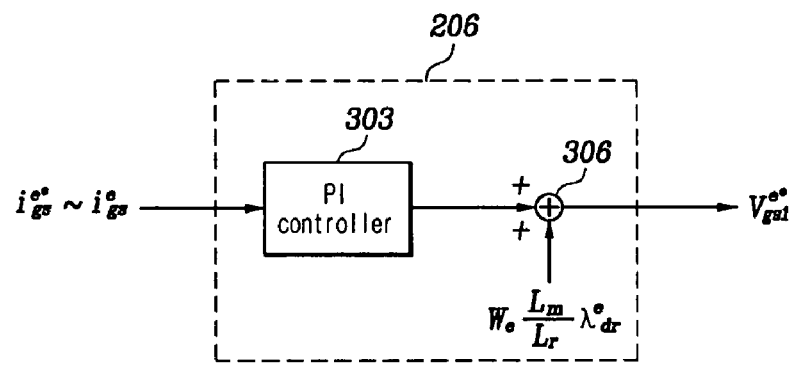
FIG. 3 is a block diagram of the q-axis current controller of FIG. 2 according to an embodiment of this invention.

FIG. 3 is a block diagram of the q-axis current controller 206 of FIG. 2 according to an embodiment of the present invention. The q-axis current controller 206 includes a PI controller 303 and a back EMF compensator 306.

The PI controller 303 performs PI control based on the difference between the q axis current ($i_{qs}^e$) and the q axis current command ($i_{qs}^{e*}$).

The back EMF compensator 306 provides a first q-axis voltage command ($V_{qs1}^{e*}$) by adding the output from the PI controller 303 and a compensation voltage for back EMF. The compensation voltage for back EMF is defined by the following equation.

Figure 4:
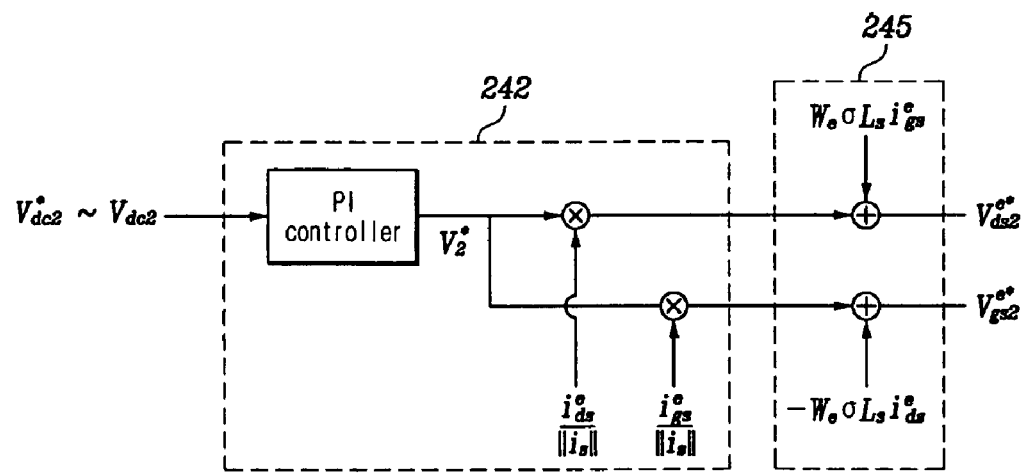
FIG. 4 is a block diagram of the voltage controller and reactive power compensator of FIG. 2 according to an embodiment of this invention.

Compensation voltage for back $$\mathrm{EMF} = w_e \frac{L_m}{L_r} \lambda_{dr}^e$$

wherein $w_e$: angular velocity of the rotor
$L_m$: mutual inductance
$L_r$: rotor inductance
$\lambda_{dr}^e$: magnetic flux of rotor Voltage Controller FIG. 4 is a block diagram of the voltage controller 242 and the reactive power compensator 245 of FIG. 2 according to an embodiment of the present invention. Since the second inverter system 140 only controls the reactive power of the induction motor 130, a power supplying means such as a battery is not required.

When charging/discharging of the capacitor 150 (FIG. 1) is required for compensating the reactive power, the second inverter 251 is controlled by the following equation:

$$v_{ds2}^{e*} = \frac{i_{ds}^{e}}{\|i_s\|}\left(k_{vp} + \frac{k_{iv}}{s}\right)(v_{dc2}^{*} - v_{dc2}) + \omega_e \sigma L_s i_{qs}^{e}$$

$$v_{qs2}^{e*} = \frac{i_{qs}^{e}}{\|i_s\|}\left(k_{vp} + \frac{k_{iv}}{s}\right)(v_{dc2}^{*} - v_{dc2}) + \omega_e \sigma L_s i_{ds}^{e}$$

wherein $v_{ds2}^{e*}$: second d-axis voltage command value
$v_{qs2}^{e*}$: second q-axis voltage command value
$i_{ds}^{e}$: d-axis current command
$i_{qs}^{e}$: q-axis current command
$v_{dc2}^{*}$: DC-link capacitor voltage command
$v_{dc2}$: DC-link capacitor voltage
$k_{vp}$: proportional control gain
$k_{vi}$: integral control gain
$i_s$: stator current
$w_e$: angular velocity of the rotor
$\sigma L_s$: leakage inductance According to the dual inverter system of present invention, back EMF compensation and reactive power compensation are performed by different inverter systems such that the limitation of output power supplied from the inverter system is prevented.

Furthermore, in the case when the three-phase induction motor 130 is adapted as an ISA for a hybrid electric vehicle, the lack of power can be prevented.

What is claimed is:

1. A vector-controlled, dual inverter system for a three-phase induction motor, comprising:
   a first inverter system adapted to be coupled to one end of three-phase windings of a stator and configured to compensate back electromotive force, in which the first inverter system interconnects a battery and a three-phase induction motor, and the second inverter system interconnects a capacitor and the three-phase induction motor; and
   a second inverter system adapted to be coupled to the other end of the three-phase windings of the stator and configured to compensate reactive power,
   wherein the first inverter system comprises:
   a q-axis current controller configured to provide proportional integral control based on a difference between a q-axis current command and a q-axis current, compensating back EMF, and generating a first q-axis voltage command;
   a magnetic flux controller configured to provide proportional integral control based on a difference between a magnetic flux command and magnetic flux, and generating a d-axis current command;
   a d-axis current controller configured to provide proportional integral control based on the difference between the d-axis current command and the d-axis current, and generating a first-d axis voltage command;
   a first d-q/three-phase coordinate converter adapted to receive the first q-axis voltage command and the first d-axis voltage command, and configured to convert the first q-axis voltage command and the first d-axis voltage command to a first three-phase voltage command;
   a first inverter configured to convert Direct Current (D.C.) power to Alternating Current (A.C.) power based on the first three-phase voltage command to the three-phase induction motor; and
   a first three-phase/d-q coordinate converter configured to detect the three-phase currents flowing from the first inverter to the three-phase induction motor and converting the three-phase currents to a q-axis current and a d-axis current,
   wherein the second inverter system comprises:
   a voltage controller configured to provide proportional integral control based on a difference between a DC-link capacitor voltage command and a DC-link capacitor voltage to estimate a voltage command vector and dividing the voltage command vector into a d-axis component and a q-axis component;
   a reactive voltage compensator compensating a d-axis component and a q-axis component and providing a second d-axis voltage command and a second q-axis voltage command;
   a second d-q/three-phase coordinate converter receiving the second q- axis voltage command and the second d-axis voltage command and converting them to a second three-phase voltage command; and
   a second inverter converting D.C. power to A.C. power based on the second three-phase voltage command to the three-phase induction motor.

2. The system of claim 1, wherein the back EMF compensation is performed based on the equation described below:
Compensation voltage for back $$\text{EMF} = w_e \frac{L_m}{L_r} \lambda_{dr}^{e}$$

wherein $W_e$: angular velocity of the rotor
$L_m$: mutual inductance
$L_r$: rotor inductance
$\lambda_{dr}^{e}$: magnetic flux of rotor.

3. The system of claim 1, wherein the second d-axis voltage command and the second q-axis voltage command provided by the reactive voltage compensator are determined based on the equations described below:

$$v_{ds2}^{e*} = \frac{i_{ds}^{e}}{\|i_s\|}\left(k_{vp} + \frac{k_{iv}}{s}\right)(v_{dc2}^{*} - v_{dc2}) + \omega_e \sigma L_s i_{qs}^{e}$$

$$v_{qs2}^{e*} = \frac{i_{qs}^{e}}{\|i_s\|}\left(k_{vp} + \frac{k_{iv}}{s}\right)(v_{dc2}^{*} - v_{dc2}) + \omega_e \sigma L_s i_{ds}^{e}$$

wherein $v_{ds2}^{e*}$: second d-axis voltage command value
$v_{qs2}^{e*}$: second q-axis voltage command value
$i_{ds}^{e}$: d-axis current command
$i_{qs}^{e}$: q-axis current command
$v_{dC2}^{*}$: DC-link capacitor voltage command
$v_{dC2}$: DC-link capacitor voltage
$k_{vp}$: proportional control gain
$k_{vi}$: integral control gain
$i_s$: stator current
$w_e$: angular velocity of the rotor
$\sigma L_s$: leakage inductance.

* * * * *

UNITED STATES PATENT AND TRADEMARK OFFICE
CERTIFICATE OF CORRECTION

PATENT NO. : 7,009,856 B2  Page 1 of 1
APPLICATION NO. : 10/750692
DATED : March 7, 2006
INVENTOR(S) : Sang Hyun Moon et al.

It is certified that error appears in the above-identified patent and that said Letters Patent is hereby corrected as shown below:

On the title page:

item (73)

"Hyundai Motor Company, Seoul (KR)"
should be changed to

-- Hyundai Motor Company, Seoul (KR);
Postech Foundation, Kyungsangbuk-Do (KR) --.

Signed and Sealed this

Twenty-seventh Day of May, 2008

JON W. DUDAS
*Director of the United States Patent and Trademark Office*